United States Patent Office 3,577,505
Patented May 4, 1971

3,577,505
CENTRIFUGAL MOLDING PROCESS FOR MANUFACTURING HUME-TYPE CONCRETE PIPES
Koreyoshi Ichihara, Kawasaki, Japan, assignor to Nippon Hume Pipe Co., Ltd.
Continuation-in-part of application Ser. No. 492,516, Oct. 4, 1965. This application July 17, 1969, Ser. No. 842,574
Claims priority, application Japan, Feb. 8, 1965, 40/6,879
Int. Cl. B28b 1/16, 1/20
U.S. Cl. 264—256                                       6 Claims

ABSTRACT OF THE DISCLOSURE

A method of manufacturing Hume-type concrete pipes by centrifugal molding. A predetermined quantity of cement slurry is introduced into a rotating pipe mold to form a layer of one density and rigidity and subsequently, a predetermined quantity of cement slurry having another density and rigidity is introduced to form another layer. One of the slurries is a hard kneaded slurry having a water content of less than saturation and of less than that required for molding. Another of the slurries is a soft kneaded slurry having a water content greater than saturation and of more than required for molding. The pipe mold is rotated such that centrifugal force commingles the surplus water from the one layer into the other layer to form a single layer having a uniform thickness and having a water content having substantially no surplus. The force created is insufficient to provide a separation of water from the slurry during molding. A single layer water content ratio of 30 to 35% water to cement is achieved.

CROSS REFERENCE TO A RELATED APPLICATION

This is a continuation-in-part of co-pending application Ser. No. 492,516, filed Oct. 4, 1965 and now abandoned.

BACKGROUND OF THE INVENTION

This invention relates to a centrifugal molding process for manufacturing Hume-type concrete pipes.

In the manufacture of concrete pipes by centrifugal force, heretofore, soft kneaded concrete has been used in order to keep operating properties of the concrete constant and to avoid the formation of air bubbles in the system of concrete layers to be molded. Since the specific gravity of water is less than that of the other materials utilized in making concrete, surplus water, which results from the fact that soft kneaded concrete contains more water than is necessary for the formation of concrete pipes, is expelled outwardly by centrifugal force. However, its outward flow is disturbed by the inner circumferential surface of the mold so that the surplus water tends to flow in the opposite direction, namely, inwardly of the concrete layers for final discharge therefrom. The unit content of water in concrete after hardening by centrifugal force has shown itself not to vary with different unit contents of cement nor different degrees of softness of concrete, rather presenting itself as approximately 120 kg./m.³. The terms "unit content of water" and "unit content of cement" as recited herein are defined as the amount of water contained in one cubic meter of concrete and the amount of cement contained in one cubic meter of concrete, respectively. Further, when the term "cement" is referred to herein, it is understood to mean "conventional portland cement." This determination has been confirmed by the following tests.

VARIOUS CEMENT SLURRIES BY WEIGHT

|  | Unit amount of cement, kg./m.³ | Unit content of water, kg./m.³ | Ratio of water to cement | Ratio of aggregate to cement | Required slump, cm. |
|---|---|---|---|---|---|
| Material No.: |  |  |  |  |  |
| A-6 | 382 | 164 | 43.0 | 5.0 | 6 |
| B-6 | 460 | 166 | 36.0 | 4.0 | |
| C-6 | 565 | 187 | 33.0 | 3.0 | |
| A-16 | 376 | 177 | 47.0 | 5.0 | 16 |
| B-16 | 453 | 178 | 39.0 | 4.0 | |
| C-16 | 555 | 200 | 36.0 | 3.0 | |

After hardening concrete of the above mentioned composition in a mold of the usual type by centrifugal force at 40G for half an hour, the water content was determined to be what is shown in the following table.

CONCRETE COMPOSITION BY WEIGHT OBTAINED BY THE CENTRIFUGAL PROCESS

|  | Slump, cm. | Unit content of water, kg./m.³ | | |
|---|---|---|---|---|
|  |  | Before hardening | After hardening | Change in content |
| Material No.: |  |  |  |  |
| A-6 | 6.5 | 164 | 122 | 42 |
| B-6 | 6.0 | 166 | 118 | 48 |
| C-6 | 6.0 | 187 | 119 | 68 |
| A-16 | 16.2 | 177 | 120 | 57 |
| B-16 | 16.0 | 178 | 120 | 58 |
| C-16 | 16.3 | 200 | 121 | 79 |

Namely, in the manufacture of Hume-type pipes, the content of water necessary for their formation was found to be approximately 120 kg./m.³. If more than this content is used, the excessive content of water will be sludged out from the inner wall of the concrete pipe during its molding operation as actually surplus water.

The surplus water is sludged out through the inner wall of the concrete pipe during the molding operation and allowed to form as a film on said inner wall and then removed therefrom by drainage.

The drainage of surplus water requires a long period of time for completion, and an appreciable amount of cement is carried away with such surplus water as a waste to be discarded.

SUMMARY OF THE INVENTION

The main object of the present invention is to offer a method for manufacturing Hume-type concrete pipes, whereby it is possible to mold concrete pipes by centrifugal force using concrete which contains sufficient water to form concrete but insufficient water to result in separation of water from the concrete during molding. In order to achieve this object, the present invention is characterized by the fact that hard kneaded concrete is used as one part of the wall thickness of concrete layers and soft kneaded concrete is used as another part of the wall thickness thereof with such proportions of water content, that the surplus problem is eliminated. Other objects of the present invention will be evident from the following description with reference to the accompanying drawings.

Figure 1:
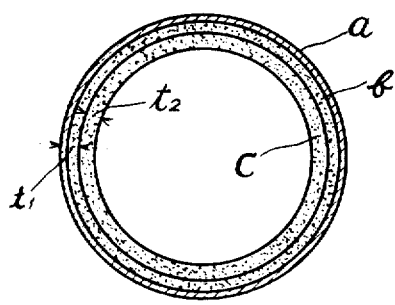
FIGS. 1 to 4 are cross-sectional views showing a mold and concrete layers formed therein according to the several embodiments of the present invention.

In the drawings, reference $a$ identifies the mold, $b$ hard kneaded concrete and $c$ soft kneaded concrete. Hard kneaded concrete is a concrete slurry which has a water content below saturation, that is, less than is required for molding. Soft kneaded concrete, on the other hand, has greater than saturation quantities of water, that is, more than is required for molding (a surplus). The commingling of said quantities of water yielding a concrete pipe having the desired water content (no surplus).

In FIG. 1, the hard kneaded concrete $b$ is fed into the mold $a$ and subsequently, the soft kneaded concrete $c$ is also fed into the same for molding by centrifugal force.

Figure 2:
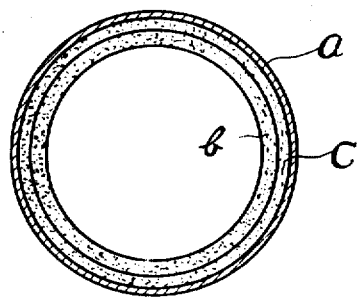

In FIG. 2, the soft kneaded concrete $c$ is fed into the mold $a$ and subsequently, the hard kneaded concrete $b$ is also fed into the same.

Figure 3:
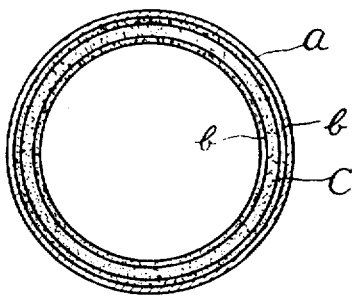

In FIG. 3, first the hard kneaded concrete $b$ is fed into the mold $a$, subsequently the soft kneaded concrete $c$ is fed into the same, and finally the hard kneaded concrete $b$ is again fed into the same.

Figure 4:
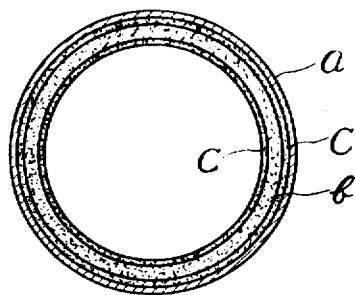

In FIG. 4, first the soft kneaded concrete $c$ is fed into the mold $a$, subsequently the hard kneaded concrete $b$ into the same, and finally the soft kneaded concrete is again fed into the same.

In each of the above mentioned embodiments, surplus water in the soft kneaded concrete $c$ is forced outwardly by centrifugal force during the molding procedure. In the embodiments shown in FIGS. 1, 3 and 4 water is permeated uniformly into the hard kneaded concrete $b$ of the outer side due to centrifugal force and capillary phenomenon. In FIG. 3, a surplus part of the water which has penetrated into the outer layer of the hard kneaded concrete $b$ impinges on the inner circumferential surface of the mold $a$, then returns inwardly thereof and finally permeates into the inner layer of the hard kneaded concrete $b$. In the case of the embodiment shown in FIG. 2, surplus water in the soft kneaded concrete $c$ impinges on the inner circumferential surface of the mold $a$, after which it flows inwardly of the mold and then permeates into the hard kneaded concrete $b$ of the inner layer. In this manner, it is possible to provide all concrete layers with the necessary amount of water for molding and hardening.

In general, in Hume-type pipes after hardening, the ratio of water to cement (hereinafter abbreviated $W/C$) is usually approximately between 30–35%. Consequently, according to the present invention, the water contents of soft concrete and hard concrete are regulated to provide a $W/C$ of the hardened pipe within the above range.

Other aspects of the invention will be apparent from the following examples:

EXAMPLE 1

There were provided ordinary portland cement of specific gravity, 3.16 and fineness, 3.2%, a fine aggregate of specific gravity, 2.72 and a coarse aggregate of specific gravity, 2.64. For practical use, the fine aggregate was mixed with the coarse aggregate in the ratio of 1.5 parts of the former to 1 part of the latter and the ratio of the mixed aggregate to cement was determined to be 1:2.

Thus, the above mentioned mixture was combined with water for use.

As shown in FIG. 1, a quantity of hard kneaded concrete $b$ (of thickness $t_1$), that is, the above noted final mixture with less than saturation quantities of water, was fed into the mold while rotating at relatively low speed and with the mold axis of rotation being kept horizontal. Subsequently, an equal quantity (of thickness $t_2$) of soft kneaded concrete $c$ was fed into the mold. The mold was then rotated at a high speed thereby generating a centrifugal force of about 30G. After half an hour surplus water in the layer $t_2$ of the soft kneaded concrete $c$ permeated into the layer $t_1$ of the hard kneaded concrete $b$ due to centrifugal force and capillary phenomenon, and when the molding procedure was completed, the concrete was in a satuarted condition throughout the entire wall thickness. When the direction of rotation of the mold $a$ was changed at regular intervals of time, the distribution of the above mentioned surplus water was accelerated.

In this embodiment, hard kneaded concrete having a $W/C$ ratio of 25% was used as the layer $t_1$ whereas soft kneaded concrete having a $W/C$ ratio of 40% was used as the layer $t_2$.

As a result, it was possible to obtain molded concrete pipes having a water content of 32.5% and there was no surplus water sludging out from the molded concrete layers.

EXAMPLE 2

Portland cement and the aggregate in proportions were the same as Example 1.

As shown in FIG. 2, soft kneaded concrete $c$ having a $W/C$ of 45% was fed into the horizontally arranged mold $a$ and subsequently an equal amount of hard kneaded concrete having a $W/C$ of 20% was fed into the mold. The concrete pipe was hardened by a centrifugal force of about 30G at a high speed of rotation, for half an hour. The surplus water was spun from the soft kneaded concrete in the outer layer, reaching the internal circumferential surface of the mold, and was returning inwardly of the mold to permeate into and be absorbed by the hard kneaded concrete of the inner layer $b$.

Therefore, no water sludged out in the inner surface of the concrete layer. Thus the water content of the concrete wall after hardening by centrifugal force was found to be a $W/C$ of 32.5%.

EXAMPLE 3

As shown in FIG. 3, an amount of hard kneaded concrete having a $W/C$ of 50% was fed into the rotating mold $a$ in the same condition as in the preceding example. Subsequently, an amount of soft kneaded concrete double that of the hard kneaded concrete, and then hard kneaded concrete $b$ having a $W/C$ of 15% and an amount equal to that of the first quantity of hard kneaded concrete was fed into the same to make the required thickness of the concrete pipe. The mold was then rotated at a high speed.

The surplus water spun from the soft kneaded concrete of the intermediate layer, flowed outwardly, and a part thereof was absorbed in the hard kneaded concrete of the outer layer. However, when the hard kneaded concrete of the outer layer was saturated, water which could not be absorbed therein was caused to reach the inner circumferential surface of the mold, and then flowing out in the direction opposite to the outer and intermediate layers again, namely, inwardly of the concrete layer.

This portion of water was absorbed in the hard kneaded concrete of the inner layer without any water being discharged in the inner surface of the concrete layer. As a result, the water content in the wall of the concrete pipe thus molded was found to be a $W/C$ of 31.0%.

EXAMPLE 4

As shown in FIG. 4, soft kneaded concrete one-fourth of the total amount, was fed into the mold $a$ with its rotating shaft kept horizontal. Subsequently, hard kneaded concrete $b$ up to one-half of the total amount was fed into said mold and then soft kneaded concrete $c$ up to the remaining one-fourth of the total amount was fed into said mold to provide the required wall thickness of the concrete pipe.

The surplus water in the soft kneaded concrete of the outer layer was caused to reach the inner circumferential surface of the mold $a$ by centrifugal force. It subsequently flowed inwardly again and was finally absorbed in the hard kneaded concrete of the intermediate layer. A hard kneaded concrete layer having a $W/C$ of 25% was used for the inner layer, and soft kneaded concrete having a $W/C$ of 40% was used. As a result, the water content of the concrete pipe after hardening by centrifugal force was found to be a $W/C$ of 32.0%.

Moreover, there was substantially no water squeezed out from the composite layer of the pipe wall during hardening.

EXAMPLE 5

Soft kneaded concrete $c$, having a $W/C$ of 50% up to one-tenth of the total amount, was fed into the mold $a$ in the same condition as in the preceding example. Subsequently hard kneaded concrete $b$ as a second layer up to three-fifths of the total amount, was fed into the mold. Finally soft kneaded concrete $c$, having a $W/C$ of 50% up to three-tenths of the total amount, was fed into the mold to make full distribution of concrete for hardening by centrifugal force at a high speed of rotation.

The water content of the wall of the concrete pipe after hardening by centrifugal force was found to be 32%, and there was substantially no water squeezed out from the composite layer of said wall during hardening.

In general, in the process of this invention, hard kneaded concrete and soft kneaded concrete are prepared with water in suitable proportions, and are introduced one after the other into the rotating mold; concrete pipes can thereby be molded by centrifugal force without sludging out water from the inner surface of the molded concrete layers.

By means of the present invention, therefore, it is possible to decrease the period of each operating cycle since drainage of excess water is unnecessary, and waste of cement material which would otherwise occur with sludging out of said excess water is eliminated.

Obviously many modifications of the invention as hereinabove set forth can be made without departing from the essence and scope thereof.

What is claimed is:

1. In the manufacture of a Hume-type concrete pipe wherein a plurality of layers of cement slurry are deposited in a pipe mold and said pipe mold is rotated about its longitudinal axis while in a substantially horizontal plane to spread said layers in substantially uniform thickness around the interior of said pipe mold, the improved method comprising the steps of: introducing a predetermined quantity of cement slurry into the rotating pipe mold to form a layer of one density and rigidity, then after a predetermined period of time introducing at least another predetermined quantity of cement slurry of another density and rigidity into the rotating pipe mold on the first said layer, one of said layers having a premeasured water content of less than saturation, and of less than required for molding and is known as a hard kneaded slurry, another layer contiguous to said first layer having a premeasured water content of greater than saturation and of more than required for molding and is known as a soft kneaded slurry, and continually rotating the pipe mold at a speed which produces a centrifugal force to commingle the surplus water from said soft kneaded slurry into said hard kneaded slurry, thereby forming a single layer of uniform thickness of a desirable water content having substantially no surplus while being insufficient to provide a separation of water from the slurry during the centrifugal molding, said water content of said single layer having a ratio of approximately 30 to 35% water to the cement composition.

2. The method of claim 1 and further comprises the step of reversing the direction of rotation of the pipe mold during the molding operation.

3. The method of claim 1 wherein said first mentioned layer is a hard kneaded layer and said second mentioned layer is a soft kneaded layer.

4. The method of claim 3 and further comprises an additional outer layer contiguous to said second mentioned layer of a hard kneaded slurry.

5. The method of claim 1 wherein said first mentioned layer is a soft kneaded layer and said second mentioned layer is a hard kneaded layer.

6. The method of claim 5 and further comprises an additional outer layer contiguous to said second mentioned layer of a soft kneaded slurry.

References Cited

UNITED STATES PATENTS

| | | | |
|---|---|---|---|
| 1,510,117 | 9/1924 | Von Vass | 25—30(X) |
| 1,556,038 | 10/1925 | Seailles et al. | 264—256 |
| 1,573,567 | 2/1926 | Nichols | 264—311 |
| 1,596,482 | 8/1926 | Ewen | 264—256(X) |
| 2,962,790 | 12/1960 | Daniel | 264—311(X) |

ROBERT F. WHITE, Primary Examiner

J. H. SILBAUGH, Assistant Examiner

U.S. Cl. X.R.

264—308, 311